United States Patent
Suzuki

(10) Patent No.: US 11,599,310 B2
(45) Date of Patent: Mar. 7, 2023

(54) NOTIFICATION SYSTEM, INFORMATION PROCESSING APPARATUS, AND SERVER SYSTEM, FOR APPROPRIATELY EXECUTING NOTIFICATION PROCESSING

(71) Applicant: CANON KABUSHIKI KAISHA, Tokyo (JP)

(72) Inventor: Takayuki Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/386,355

(22) Filed: Jul. 27, 2021

(65) Prior Publication Data
US 2022/0035578 A1 Feb. 3, 2022

(30) Foreign Application Priority Data
Jul. 28, 2020 (JP) .............................. JP2020-127363

(51) Int. Cl.
G06F 3/12 (2006.01)

(52) U.S. Cl.
CPC ............ *G06F 3/1208* (2013.01); *G06F 3/125* (2013.01); *G06F 3/1207* (2013.01); *G06F 3/1256* (2013.01); *G06F 3/1259* (2013.01); *G06F 3/1287* (2013.01); *G06F 3/1288* (2013.01)

(58) Field of Classification Search
CPC ...... G06F 3/1208; G06F 3/1207; G06F 3/125; G06F 3/1256; G06F 3/1288
USPC ....................................................... 358/1.15
See application file for complete search history.

(56) References Cited

U.S. PATENT DOCUMENTS

| | | | | |
|---|---|---|---|---|
| 6,681,246 B1 * | 1/2004 | Dutta | ........................ | H04L 9/40 709/219 |
| 2002/0175958 A1 * | 11/2002 | Natori | .................... | G06K 15/02 347/5 |

FOREIGN PATENT DOCUMENTS

JP         2017134628 A         8/2017

* cited by examiner

*Primary Examiner* — Jamares Q Washington
(74) *Attorney, Agent, or Firm* — Canon U.S.A., Inc. IP Division

(57) ABSTRACT

An information processing apparatus is controlled to execute, at a first timing, notification processing for a first printed material obtained by printing a first content, based on information indicating that a content printed by a printing apparatus corresponds to the first content, and the information processing apparatus is controlled to execute, at a second timing earlier than the first timing, notification processing for a second printed material obtained by printing a second content, based on information indicating that the content printed by the printing apparatus corresponds to the second content, the second content being different from the first content.

18 Claims, 13 Drawing Sheets

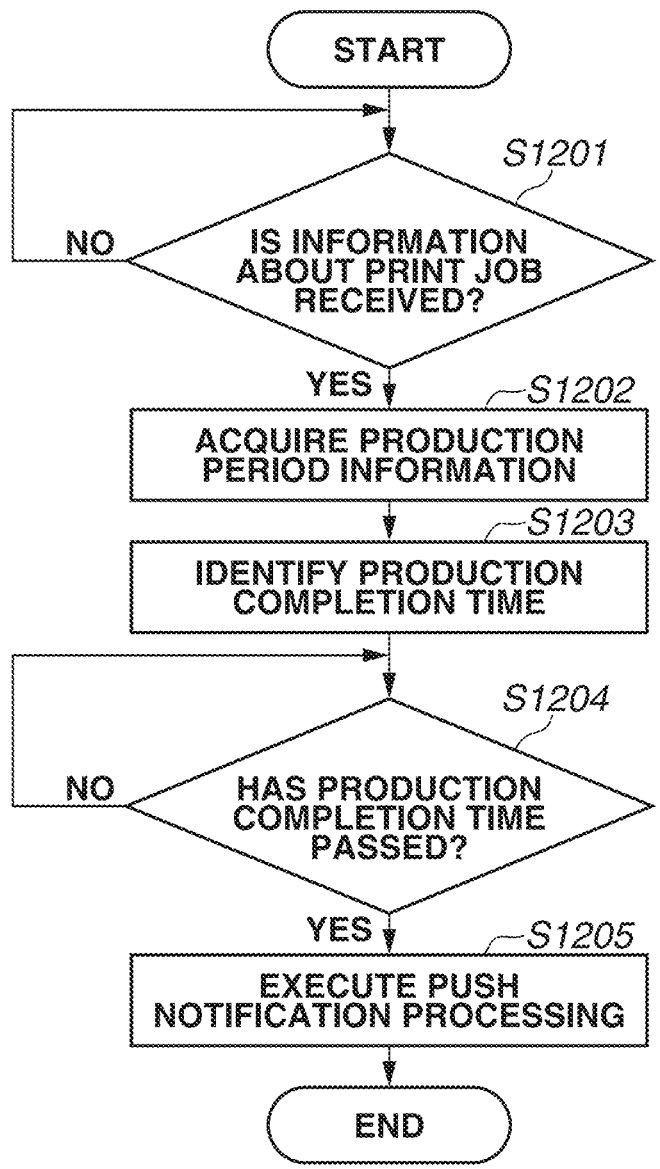

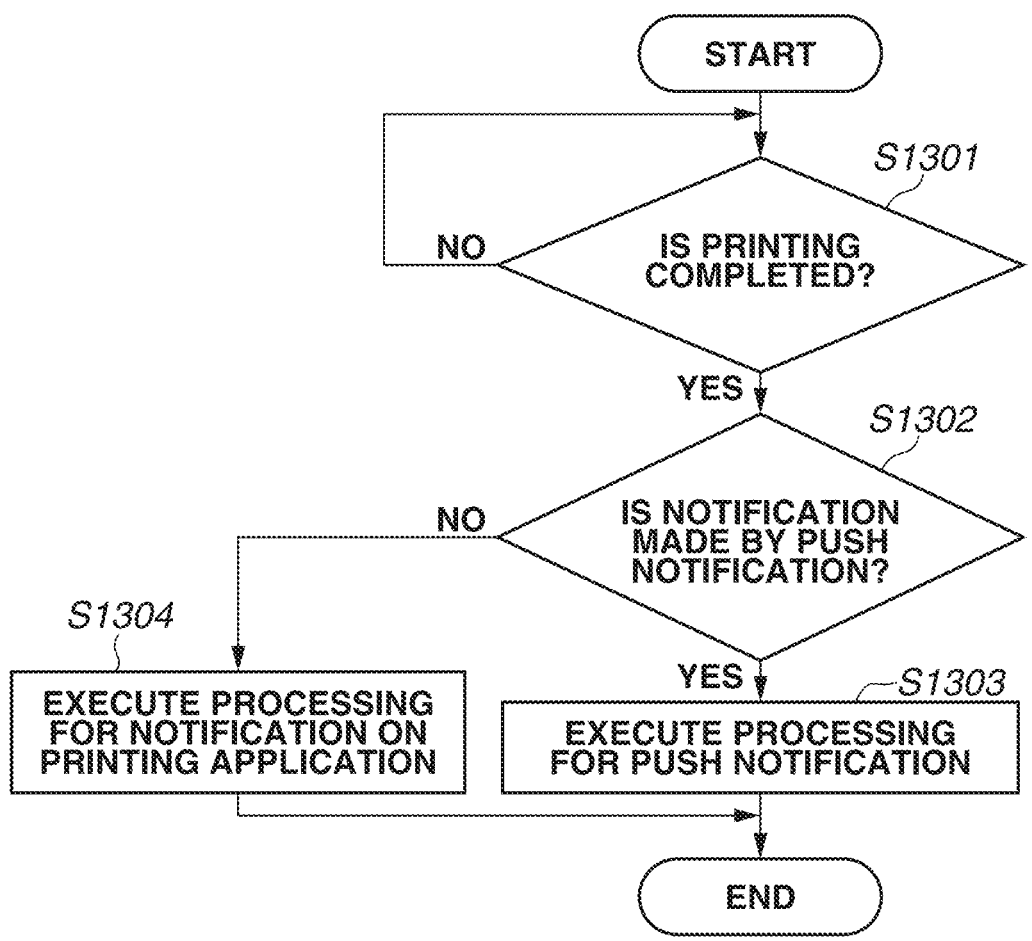

NOTIFICATION SYSTEM, INFORMATION PROCESSING APPARATUS, AND SERVER SYSTEM, FOR APPROPRIATELY EXECUTING NOTIFICATION PROCESSING

BACKGROUND

Field

The present disclosure relates to a notification system, an information processing apparatus, and a server system.

Description of the Related Art

A technique in which notification information is transmitted to an information processing apparatus, such as a smartphone, and the information processing apparatus executes notification processing is known. Japanese Patent Application Laid-Open No. 2017-134628 discusses a technique in which a mobile terminal device receives a push notification from a push notification delivery server and executes notification processing to transmit a push notification, for example.

Along with the popularization of information processing apparatuses that execute notification processing, there is a demand for a technique for controlling such information processing apparatuses to appropriately execute notification processing.

SUMMARY

Various embodiments of the present disclosure provide techniques and mechanisms for controlling an information processing apparatus to appropriately execute notification processing.

According to various embodiments of the present disclosure, a notification system is provided which includes a printing apparatus and a server system. The server system is provided outside the printing apparatus and outside an information processing apparatus. The printing apparatus includes a printing unit configured to print a content. And the server system includes a control unit configured to control the information processing apparatus to execute, at a first timing, notification processing for a first printed material obtained by printing a first content, based on information indicating that the content printed by the printing apparatus corresponds to the first content, and to control the information processing apparatus to execute, at a second timing earlier than the first timing, notification processing for a second printed material obtained by printing a second content, based on information indicating that the content printed by the printing apparatus corresponds to the second content, where the second content is different from the first content.

Further features of the present disclosure will become apparent from the following description of exemplary embodiments with reference to the attached drawings.

BRIEF DESCRIPTION OF THE DRAWINGS

FIG. 12 is a flowchart illustrating processing for the push notification according to one embodiment.

FIG. 13 is a flowchart illustrating processing for controlling whether to execute a notification of a printed material by push notification, or to execute the notification on a screen displayed in the foreground by the printing application according to one embodiment.

DESCRIPTION OF THE EMBODIMENTS

Exemplary embodiments of the present disclosure will be described in detail below with reference to the accompanying drawings. The following exemplary embodiments are not intended to limit the present invention according to the claims, and not all combinations of features described in the exemplary embodiments are essential to the solving means of each embodiment of the present disclosure.

The following exemplary embodiments illustrate a case where a smartphone is used as an example of an information processing apparatus. However, embodiments of the present disclosure can be applied to any type of information processing apparatus as long as the information processing apparatus can handle the content to be printed. For example, embodiments of the present disclosure can be implemented in various types of information processing apparatuses, such as a mobile terminal other than a smartphone, a laptop personal computer (PC), a desktop PC, a tablet terminal, a personal digital assistant (PDA), and a digital camera. Embodiments of the present disclosure can also be implemented as a printing apparatus, for example, an inkjet printer or a laser beam printer. A multi-function peripheral including not only a printing function, but also a scanning function for scanning a document, a copying function, and a facsimile function can also be used.

Figure 1:
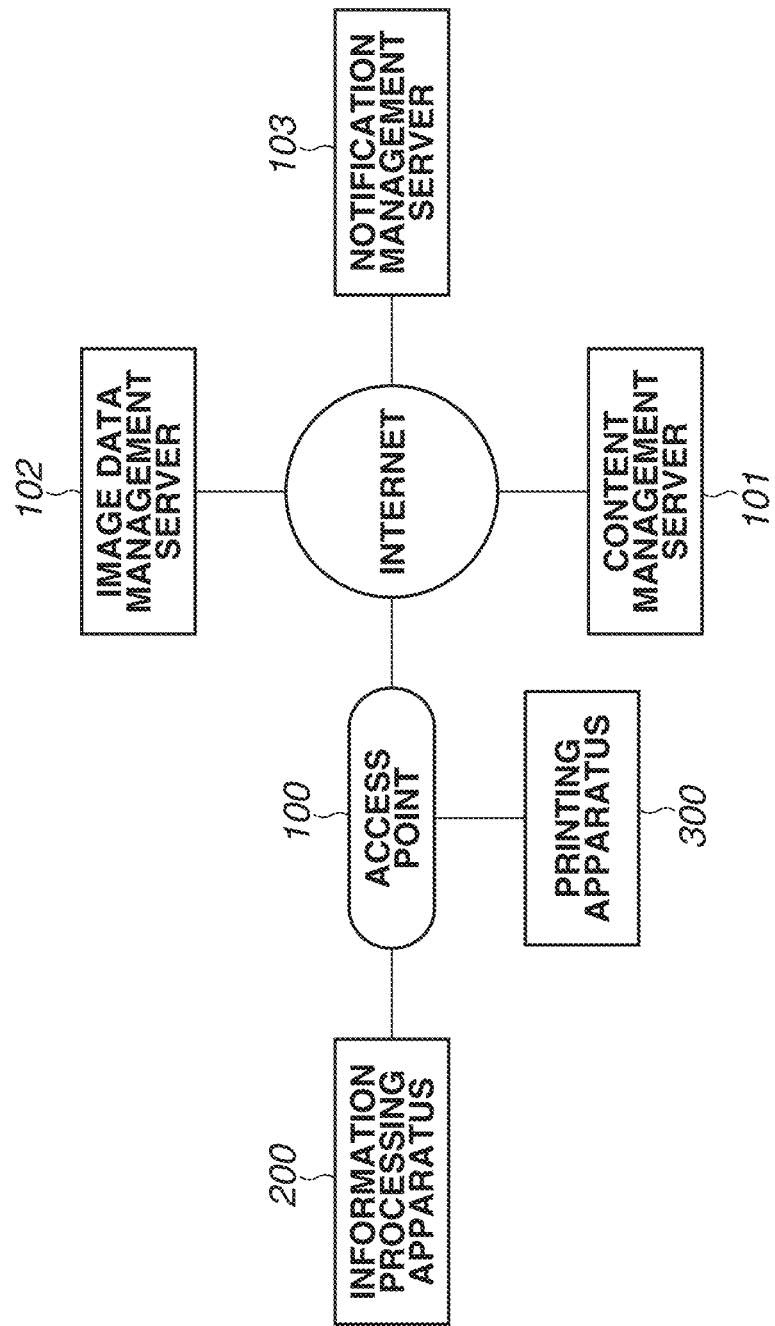
FIG. 1 is a diagram illustrating a configuration of a notification system according to one embodiment.

FIG. 1 illustrates an example of a configuration of a notification system. This notification system includes an information processing apparatus 200 and a printing apparatus 300. The information processing apparatus 200 is an information processing apparatus that communicates with the printing apparatus 300 via a network established by an access point 100, and causes the printing apparatus 300 to execute printing. The information processing apparatus 200 stores a program, such as a printing application program (hereinafter referred to as a printing application) to be described below. Print data created using the printing application is transmitted from the information processing apparatus 200 to the printing apparatus 300 via the network. For example, the printing application is downloaded and installed into the information processing apparatus 200 via the network. The printing application may be installed from, for example, a recording medium connected to the information processing apparatus 200. The access point 100 according to a first exemplary embodiment functions as a wireless local area network (LAN) router. Accordingly, the information processing apparatus 200 is connected to the Internet via the wireless LAN router. With this configuration, the information processing apparatus 200 can communicate with a content management server 101 via the Internet. While FIG. 1 illustrates only one printing apparatus 300, a plurality of printing apparatuses 300 can be connected to the access point 100.

The content management server 101 is a server that manages a content to be used by the printing application. An image data management server 102 is a server that can store image data captured by a user using a camera. A notification management server 103 is a server that manages application notification information and executes notification processing according to the present exemplary embodiment. Each of the above-described servers is a server system that may be configured using a single server PC, or may be configured using a plurality of server PCs. In other words, processing to be executed by each of the above-described servers may be executed by a plurality of server PCs cooperating with each other, instead of being executed by a single server PC.

Figure 2:
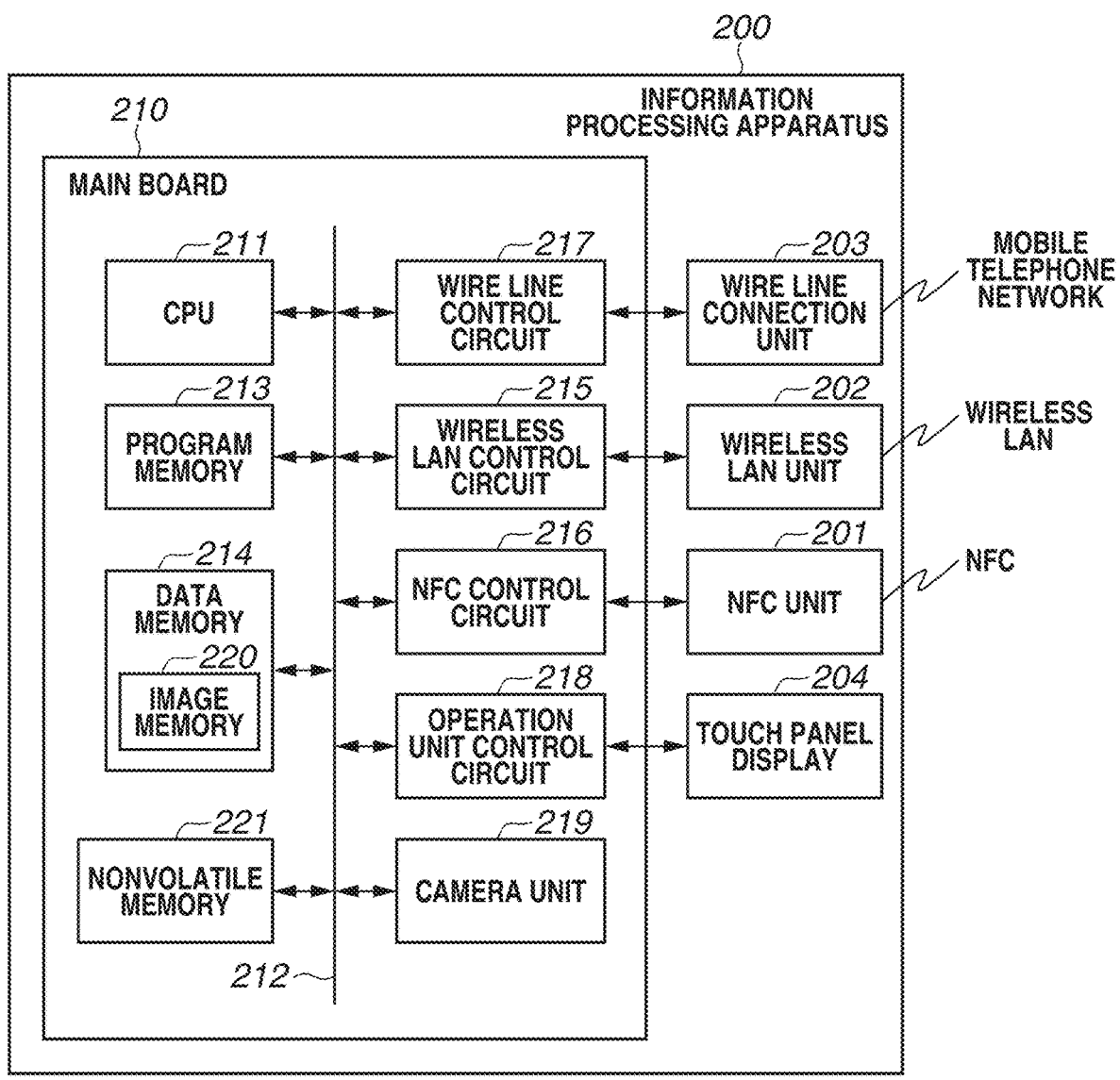
FIG. 2 is a block diagram illustrating a configuration of an information processing apparatus according to one embodiment.

FIG. 2 is a block diagram illustrating an example of a configuration of the information processing apparatus 200 according to the present exemplary embodiment. The information processing apparatus 200 includes a main board 210 that controls the entire apparatus, a wireless LAN unit 202, a near-field communication (NFC) unit 201, a wire line connection unit 203, and a touch panel display 204 that displays functions and operations of the printer and information about the printer. The NFC unit 201, the wireless LAN unit 202, and the wire line connection unit 203 can communicate with each other using an NFC, a wireless LAN, or a mobile telephone network.

A central processing unit (CPU) 211 in the form of a microprocessor disposed in the main board 210 operates based on a control program stored in a program memory 213 in the form of a read-only memory (ROM) connected via an internal bus 212 and based on contents of a data memory 214 in the form of a random access memory (RAM). The program memory 213 can store programs, such as an embedded operating system (OS) and the printing application according to the present exemplary embodiment. In the present exemplary embodiment, application programs stored in the program memory 213 are subjected to software execution control under control of the OS. Specifically, the application programs are implemented by the CPU 211 loading application programs stored in the program memory 213 into the data memory 214 in the form of a RAM and executing the loaded application programs.

The CPU 211 controls the wireless LAN unit 202 via a wireless LAN control circuit 215, to communicate with another apparatus via the wireless LAN. The wireless LAN unit 202 can perform data (packet) communication by a communication method compliant with, for example, Institute of Electrical and Electronics Engineers (IEEE) 802.11 series (IEEE 802.11a, IEEE 802.11b, IEEE 802.11g, etc).

The CPU 211 controls the NFC unit 201 via an NFC control circuit 216, to detect a connection by NFC with another NFC terminal and to transmit and receive data to and from the other NFC terminal. Further, the CPU 211 controls the wire line connection unit 203 via a wire line control circuit 217, to connect to the mobile telephone network to make a call or transmit and receive data. The CPU 211 may include a unit for implementing a communication method, such as Bluetooth® Low Energy.

The CPU 211 controls an operation unit control circuit 218, to perform displaying on the touch panel display 204 and to receive an operation from the user. The CPU 211 controls a camera unit 219, to capture images and to store captured images in an image memory 220 in the data memory 214. The CPU 211 can store not only captured images, but also images acquired from an external apparatus via the mobile telephone network, wireless LAN, or NFC in the image memory 220, and can also transmit images to the external apparatus.

A nonvolatile memory 221 includes a memory, such as a flash memory, and stores data to be saved after a power supply is turned off. The nonvolatile memory 221 stores, for example, telephone directory data, various communication connection information, information about devices previously connected, and image data to be saved. The nonvolatile memory 221 also stores application management information that is managed by the printing application according to the present exemplary embodiment.

Figure 3:
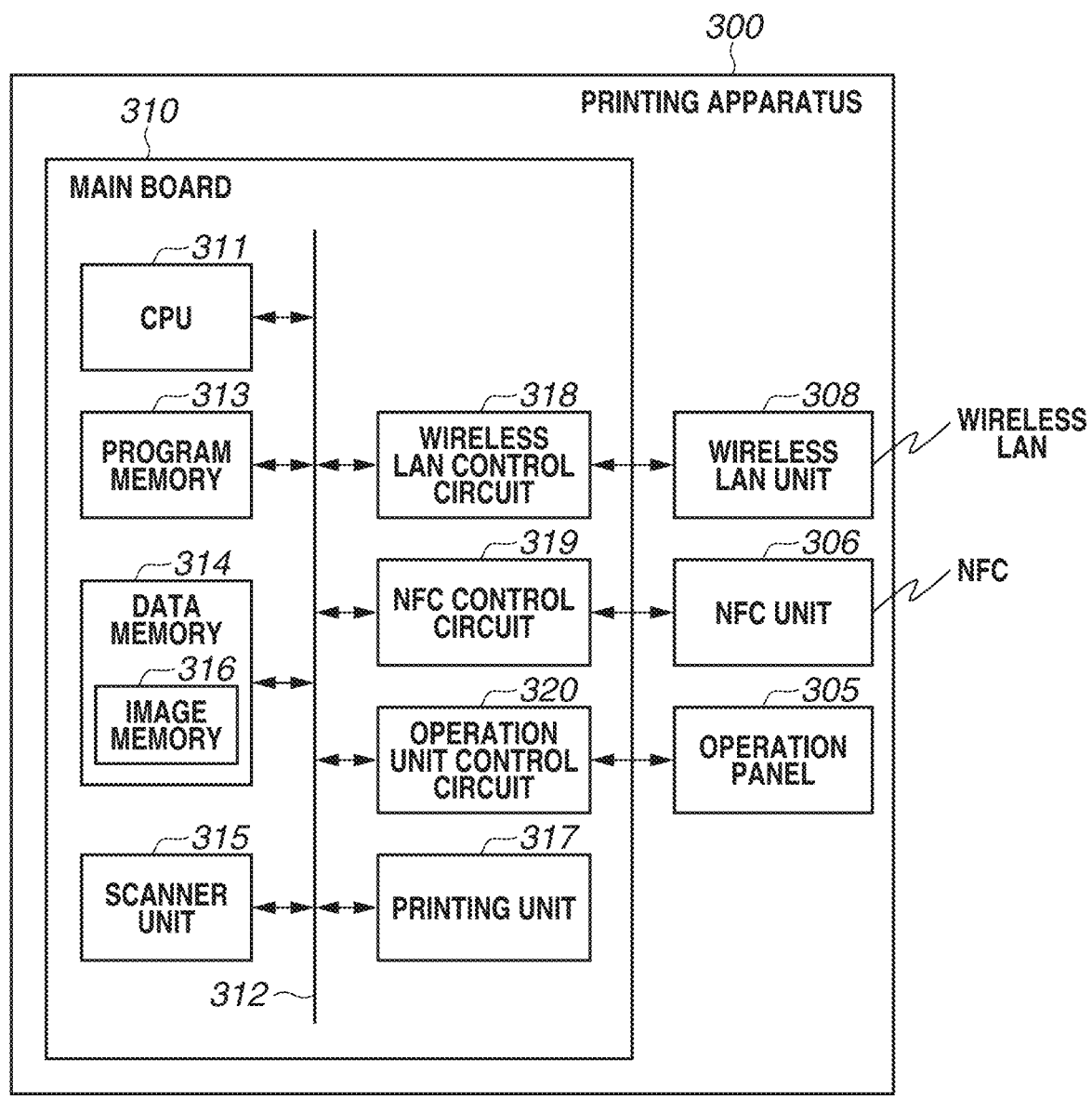
FIG. 3 is a block diagram illustrating a configuration of a printing apparatus according to one embodiment.

FIG. 3 is a block diagram illustrating an example of a configuration of the printing apparatus 300 according to the present exemplary embodiment. The printing apparatus 300 includes a main board 310 that controls the entire apparatus, a wireless LAN unit 308, an NFC unit 306, and an operation panel 305. Each of the wireless LAN unit 308 and the NFC unit 306 functions as a communication unit of the printing apparatus 300.

A CPU 311 in the form of a microprocessor disposed in the main board 310 operates in accordance with a control program stored in a program memory 313 in the form of a ROM connected via an internal bus 312, and based on the contents of a data memory 314 in the form of a RAM.

The CPU 311 controls a scanner unit 315 to scan a document, and stores scanned image data in an image memory 316 in the data memory 314. The CPU 311 controls a printing unit 317, to print an image stored in the image memory 316 in the data memory 314 on a recording medium. The CPU 311 can also transmit the scanned image data to the information processing apparatus 200 via the wireless LAN unit 308 controlled by a wireless LAN control circuit 318. In the present exemplary embodiment, the printing unit 317 is configured to perform printing by an inkjet method. However, the configuration of the printing unit 317 is not limited to this configuration. The printing unit 317 may perform printing by other methods, such as an electrophotographic method and a thermal sublimation method.

The CPU 311 controls the wireless LAN unit 308 via the wireless LAN control circuit 318, to communicate with another apparatus via the wireless LAN. The wireless LAN unit 308 can perform data (packet) communication by a communication method compliant with, for example, IEEE 802.11 series (IEEE 802.11a, IEEE 802.11b, IEEE 802.11g, etc.). The CPU 311 controls the NFC unit 306 via an NFC control circuit 319, to detect a connection by NFC with another NFC terminal and to transmit and receive data to and from the other NFC terminal. The communication method for use in communication that can be executed by the printing apparatus 300 is not limited to the above-described methods. A communication can also be established by other communication methods, such as Bluetooth® Classic and Bluetooth® Low Energy.

The CPU 311 controls an operation unit control circuit 320, to display the state of the printing apparatus 300 and a function selection menu on the operation panel 305 and to receive an operation from the user.

The printing apparatus 300 according to the present exemplary embodiment can receive a print job including data in Joint Photographic Experts Group (JPEG) file format to which a printer control command is added, and can execute printing based on the print job.

Figure 10:
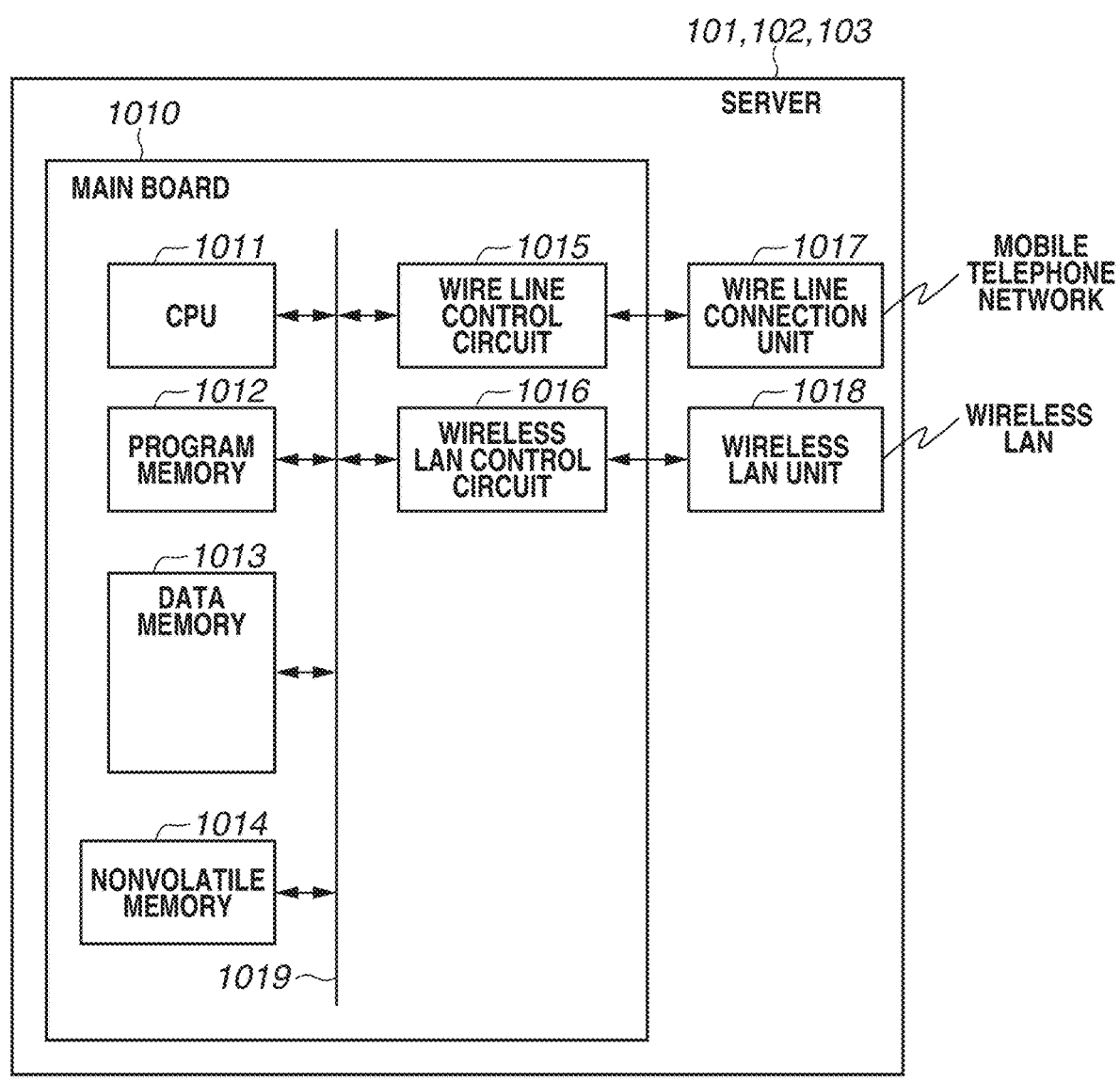
FIG. 10 is a diagram illustrating a configuration of a server according to one embodiment.

FIG. 10 is a block diagram illustrating an example of a configuration of each of the content management server 101, the image data management server 102, and the notification management server 103 according to the present exemplary embodiment. Each server includes a main board 1010 that controls the entire apparatus, a wireless LAN unit 1018, and a wire line connection unit 1017. In this case, the wireless LAN unit 1018 and the wire line connection unit 1017 can communicate with each other using the wireless LAN or the mobile telephone network.

A CPU 1011 in the form of a microprocessor disposed in the main board 1010 operates in accordance with a control program stored in a program memory 1012 in the form of a ROM connected via an internal bus 1019, and in accordance with the contents of a data memory 1013 in the form of a RAM. The program memory 1012 can store programs, such as an embedded OS. In the present exemplary embodiment, application programs stored in the program memory 1012 are subjected to software execution control under control of the OS. Specifically, the application programs are implemented by the CPU 1011 loading application programs stored in the program memory 1012 into the data memory 1013 in the form of a RAM and executing the loaded application programs.

The CPU 1011 controls the wireless LAN unit 1018 via a wireless LAN control circuit 1016, to communicate with another apparatus via the wireless LAN. The wireless LAN unit 1018 can perform data (packet) communication by a communication method compliant with, for example, IEEE 802.11 series (IEEE 802.11a, IEEE 802.11b, IEEE 802.11g, etc.).

Further, the CPU 1011 controls the wire line connection unit 1017 via a wire line control circuit 1015, to connect to the mobile telephone network to make a call or transmit and receive data.

A nonvolatile memory 1014 includes a memory, such as a flash memory, and stores data to be saved after the power supply is turned off. For example, a content is stored in the nonvolatile memory 1014 in the content management server 101, image data is stored in the nonvolatile memory 1014 in the image data management server 102, and information for notification control to be described below is stored in the nonvolatile memory 1014 in the notification management server 103.

The configurations of the content management server 101, the image data management server 102, and the notification management server 103 are not necessarily identical to each other.

Next, display screens for the printing application according to the present exemplary embodiment and operations of the display screens will be described with reference to FIGS. 4 to 9. The display screens illustrated in FIGS. 4 to 9 are each displayed on the touch panel display 204 when the printing application stored in the program memory 213 is executed by the CPU 211. A description will be given of a case where a user interface control program for the printing application according to the present exemplary embodiment is created using a program language that operates in a multi-platform, such as HyperText Markup Language (HTML) 5 or JavaScript®. The program language to be used is not limited to these examples. A platform dependent language, such as Java® or Objective-C, may be used to create the user interface control program.

Each processing to be executed in a state where a screen is displayed by the printing application to be described below is implemented by the CPU 211 loading a program for the printing application stored in the program memory 213 or the like into the data memory 214 in the form of a RAM and executing the loaded program. All the processing to be described below is not necessarily executed sequentially in a single process. For example, the OS may execute processing once and the printing application may be invoked from the OS again, and then the subsequent processing may be executed by the printing application.

Figure 4:
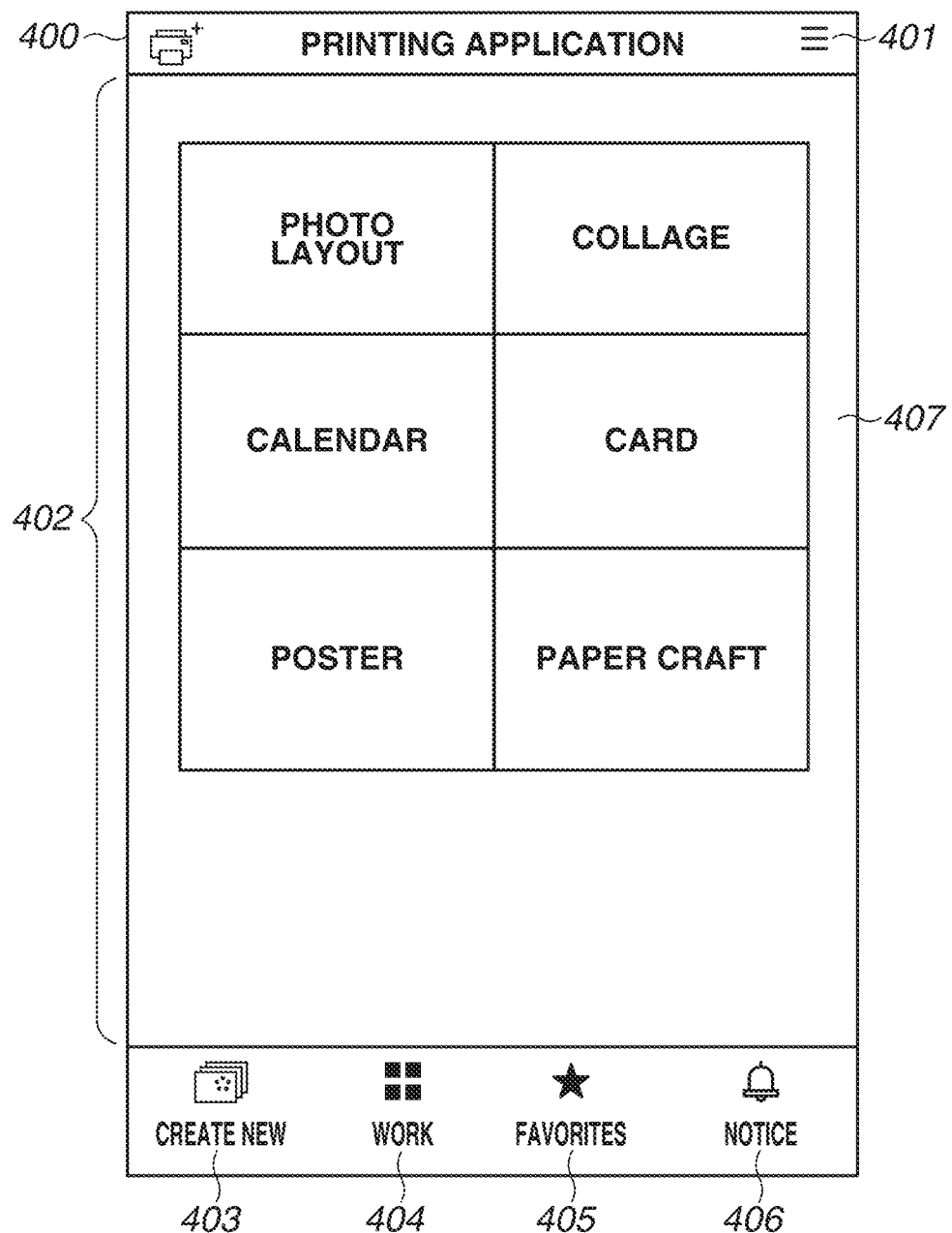
FIG. 4 is a diagram illustrating a main screen for a printing application according to one embodiment.

FIG. 4 illustrates an example of a main screen for the printing application according to the present exemplary embodiment. On the main screen illustrated in FIG. 4, a printer registration button 400, a menu button 401, a main display area 402, a create new button 403, a work display button 404, a favorites display button 405, and a notice display button 406 are displayed.

In a case where any one of the buttons 403 to 406 is tapped, the contents corresponding to the tapped button are displayed on the main display area 402. FIG. 4 illustrates a display example of the main display area 402 when the printing application is started, or when the create new button 403 for newly creating print data is tapped.

In a case where the printer registration button 400 is tapped, a printer registration screen (not illustrated) is displayed. In registration processing to be executed using the printer registration screen, a printer to which a print job is transmitted is selected and set. In a case where the menu button 401 is tapped, various pieces of information about the printing application, such as version information and license information, are displayed.

On the main screen illustrated in FIG. 4, a plurality of category selection buttons 407 is displayed on the main display area 402. The category selection buttons 407 correspond to the respective categories for pieces of work that can be printed by the printing application according to the present exemplary embodiment. Text, such as "calendar" or "card", is displayed on each of the category selection buttons 407 on the main screen illustrated in FIG. 4. In addition to such text, an icon corresponding to each category may be displayed. In a case where any one of the category selection buttons 407 is tapped, the display target of the touch panel display 204 shifts to a screen for printing the content in the category corresponding to the tapped category selection button 407. Specifically, for example, in a case where the category selection button 407 indicating "paper craft" is tapped, the display target shifts to a screen for creating a paper craft. Similarly, in a case where the category selection button 407 indicating "calendar" is tapped, the display target shifts to a screen for creating a calendar. The main screen illustrated in FIG. 4 includes the category selection buttons 407 indicating "calendar", "card", and the like. In a case where any one of the category selection buttons 407 is selected, a function for executing printing using the content corresponding to the selected category selection button 407 is executed. A content may be image data to be printed, or may be a template on which another image data is set. In the present exemplary embodiment, a content is acquired from the content management server 101, but instead may be preliminarily held in the printing application. A content that can be used for printing and an editing function, such as insertion of an image or insertion of text into a content, vary depending on the category selection button 407 tapped by the user. In the present exemplary embodiment, the categories that can be selected by tapping any one of the category selection buttons 407 include a category including a content that requires an assembly after printing. In the present exemplary embodiment, the category including a content that requires an assembly after printing is "paper craft". The term "assembly" used in the present exemplary embodiment refers to a process of processing a printed material by cutting, folding, or bonding the printed material, to create a piece of work. Accordingly, in the present exemplary embodiment, the content that requires an assembly after printing includes an assisting image area for assisting or guiding the user to perform the assembly (processing). Examples of the assisting image area include a line indicating a cutting position, a line indicating a folding position, and an overlap width. One or more printed materials may be obtained by printing a single content. For example, in a case where a content for creating a piece of work by combining a plurality of parts is used, printed materials corresponding to the plurality of parts, respectively, are used, so that a plurality of printed materials is obtained by printing a single content. In the present exemplary embodiment, control processing in which a period for producing a piece of work is taken into consideration is executed. It is thus considered that the period for producing a piece of work increases as the number of parts for producing the work increases.

In a case where the work display button 404 illustrated in FIG. 4 is tapped, a list of thumbnails corresponding to pieces of work stored by the user is displayed on the main display area 402 in an icon state. Each piece of work stored by the user is image data that is to be printed and is created by the user when any one of the category selection buttons 407 is selected. Alternatively, in the list display, the pieces of work may be distinguished for each of the categories corresponding to the category selection buttons 407 and thumbnails may be displayed.

In a case where the favorites display button 405 is tapped, a screen indicating a list of contents that are registered as favorites by the user is displayed on the main display area 402. In a case where the notice display button 406 is tapped, notification information indicating a content update notice or the like is displayed on the main display area 402.

Next, a display example in a case where any one of the category selection buttons 407 is tapped will be described. In a case where any one of the category selection buttons 407 is tapped, the display target shifts to a content selection screen for displaying a list of contents corresponding to the selected category.

Figure 5:
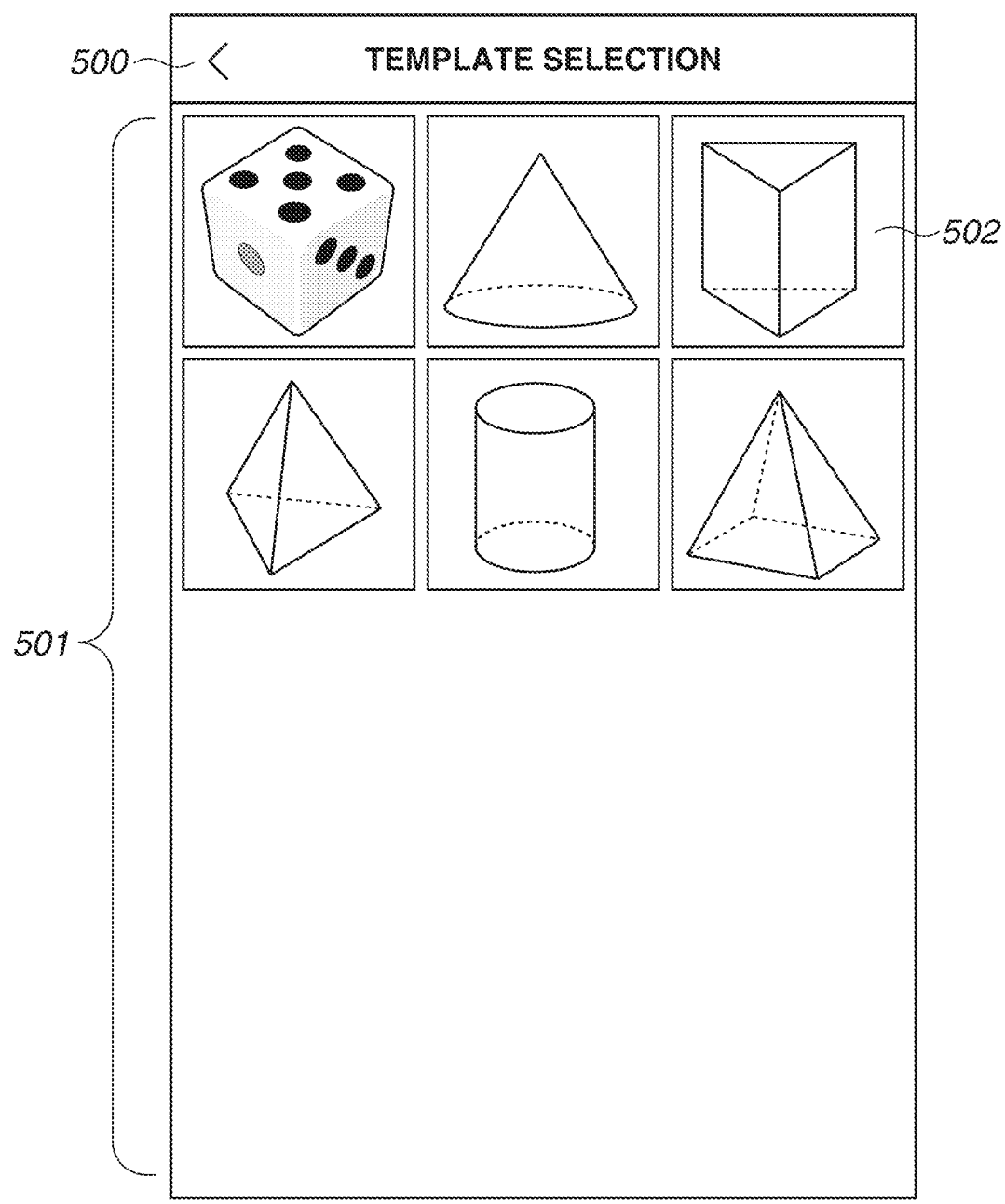
FIG. 5 is a diagram illustrating a content selection screen according to one embodiment.

FIG. 5 illustrates an example of the content selection screen corresponding to "paper craft". The content selection screen includes a back button 500 and a content thumbnail display area 501. In a case where the back button 500 is tapped, the display target of the touch panel display 204 shifts to the screen (screen illustrated in FIG. 4) displayed before shifting to the currently displayed screen. A plurality of content thumbnails 502 is displayed on the content thumbnail display area 501. Each of the content thumbnails 502 is an area on which a content corresponding to each category is displayed as a thumbnail. In particular, the content thumbnail 502 corresponding to "paper craft" is an area on which a piece of craft work obtained by assembling a printed material obtained by printing the content corresponding to "paper craft" is displayed as a thumbnail. The content thumbnail 502 corresponding to a content other than "paper craft" (content that does not require an assembly of a printed material) may be an area on which the content itself is displayed as a thumbnail. In a case where any one of the content thumbnails 502 is tapped (selected), the display target shifts to a content details screen indicating details of the selected content thumbnail.

Figure 6:
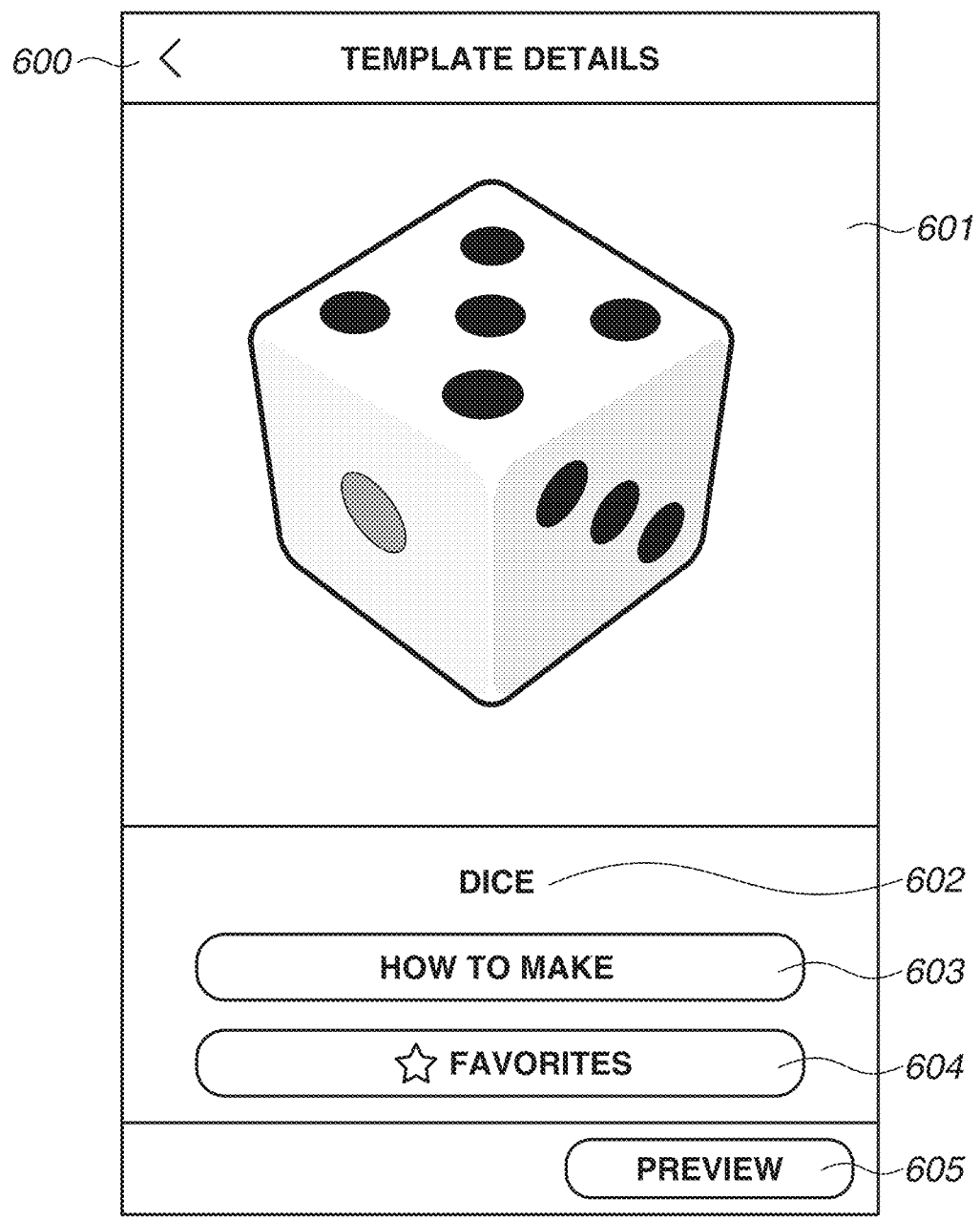
FIG. 6 is a diagram illustrating a content details screen according to one embodiment.

FIG. 6 illustrates an example of the content details screen. The content details screen includes a back button 600, content details 601, a content name 602, a content creation method display button 603, a favorites button 604, and a preview button 605. In a case where the content corresponding to the content details screen corresponds to a content on which an editing operation, such as insertion of an image or insertion of text, can be executed, the preview button 605 functions as an editing button. In a case where the back button 600 is tapped, the display target of the touch panel display 204 shifts to the screen (screen illustrated in FIG. 5) displayed before shifting to the currently displayed screen. In a case where the content creation method display button 603 is tapped, the printing application downloads a file indicating a craft work creation method from the content management server 101 and uses the downloaded file, to display a screen indicating the craft work creation method (not illustrated). The craft work creation method is a method for assembling a printed material obtained by printing the content corresponding to the content details screen. The user can create a piece of craft work by assembling the printed material according to the method. The file indicating the craft work creation method may be preliminarily included in the printing application, instead of being downloaded from an external server. In the present exemplary embodiment, the content creation method display button 603 is displayed only on the content details screen for a content that requires an assembly. In the present exemplary embodiment, the content creation method display button 603 is displayed only on the content details screen for the content in the category corresponding to "paper craft", and is not displayed on the content details screen for a content in a category other than "paper craft".

In a case where the favorites button 604 is tapped, the content corresponding to the content details screen currently displayed is registered as favorites. The content registered as favorites is indicated on a screen to be displayed when the favorites display button 405 is tapped. In a case where the preview button 605 is tapped, the display target shifts to a preview screen indicating a printed material (print result) obtained when the content corresponding to the content details screen is printed. In the present exemplary embodiment, in a case where the content selected on the content selection screen corresponds to a content included in the content management server 101, the printing application downloads the content in response to the preview button 605 (or the editing button) being tapped. Further, the printing application displays the preview screen corresponding to the content based on the downloaded content. The configuration of the printing application according to the present exemplary embodiment is not limited to this configuration. The printing application may download the content before the content details screen is displayed (or during a period in which the content details screen is displayed) in response to the content being selected on the content selection screen. In a case where the content selected on the content selection screen corresponds to a content that is preliminarily held in the printing application, the printing application displays the preview screen based on the preliminarily held content, without executing downloading of the content from an external server.

Figure 7:
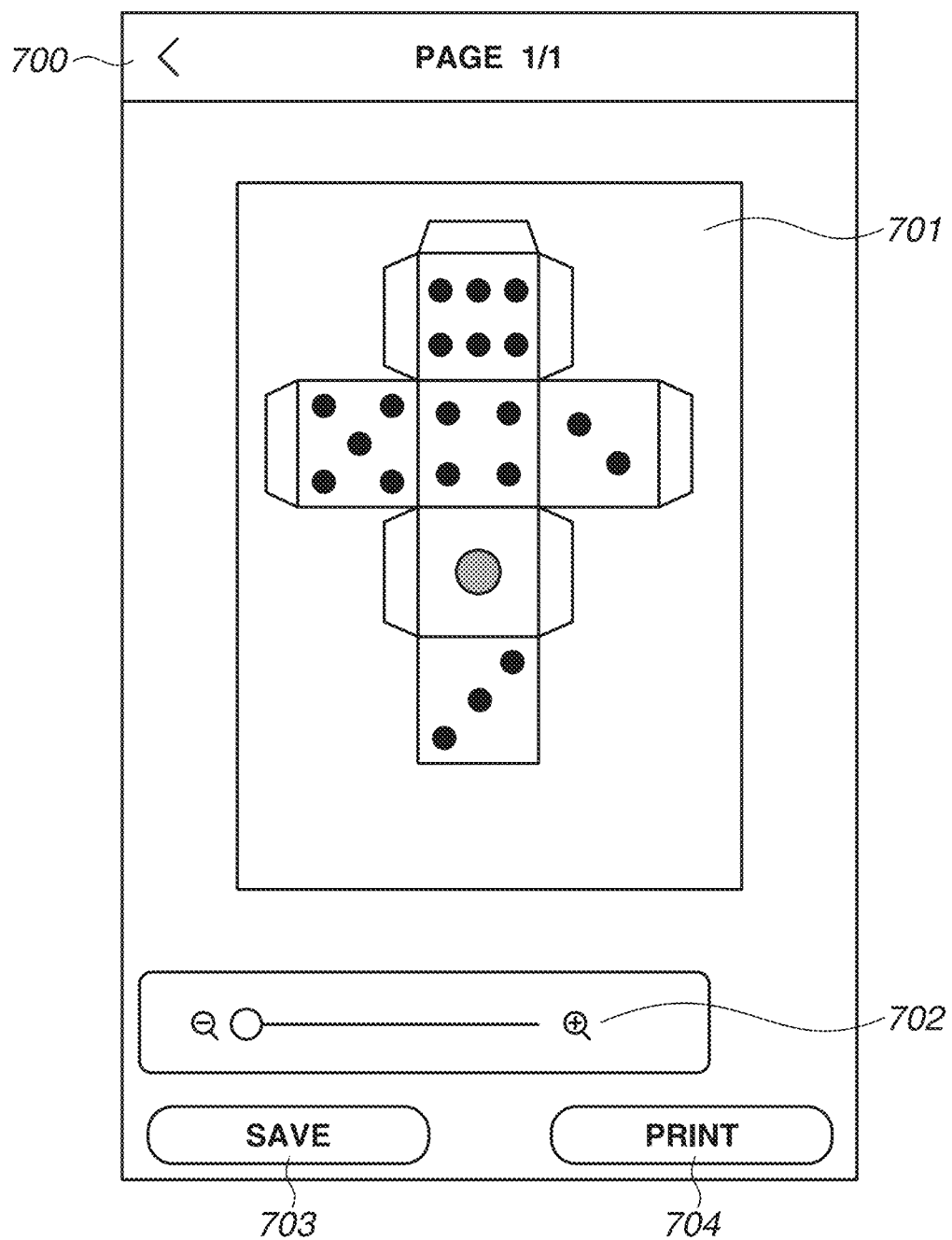
FIG. 7 is a diagram illustrating a preview screen according to one embodiment.

FIG. 7 illustrates an example of the preview screen. The preview screen includes a back button 700, a print preview 701, a preview display reduction/enlargement control 702, a save button 703, and a print button 704. In a case where the back button 700 is tapped, the display target of the touch panel display 204 shifts to the screen (screen illustrated in FIG. 6) displayed before shifting to the currently displayed screen. The print preview 701 indicates a printed material (print result) to be obtained by printing the content selected by the user. In a case where the preview display reduction/enlargement control 702 is operated, the display area of the print preview 701 is enlarged or reduced. In a case where the save button 703 is tapped, the content corresponding to the print preview 701 currently displayed is saved. The saved content is displayed on a screen that is displayed in response to the work display button 404 being tapped. In a case where the print button 704 is tapped, the display target shifts to a print settings check screen.

Figure 8:
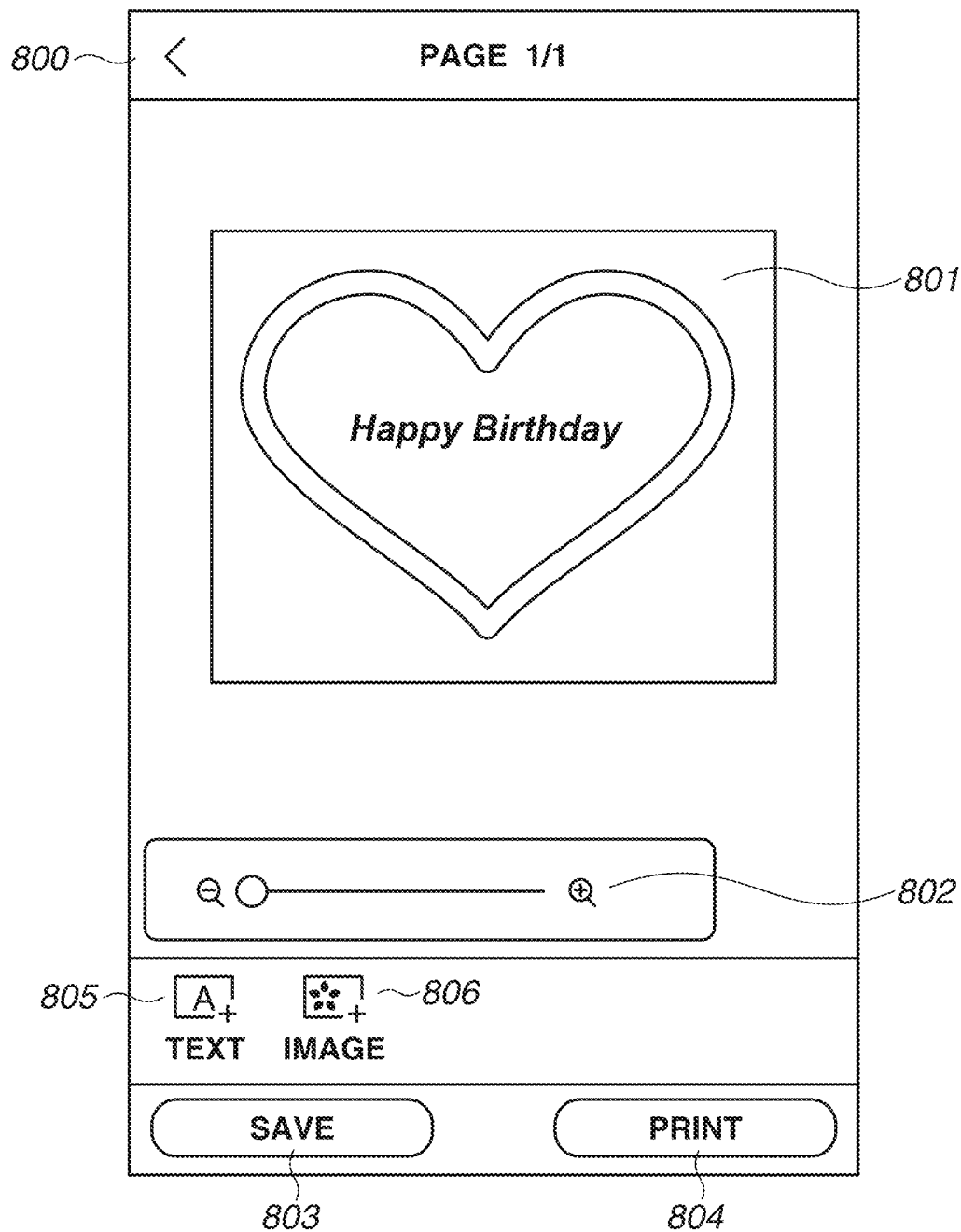
FIG. 8 is a diagram illustrating an editing screen according to one embodiment.

As described above, in a case where the content corresponding to the content details screen corresponds to a content on which an editing operation, such as insertion of an image or insertion of text, can be executed, the editing button is displayed instead of the preview button 605 on the content details screen. In a case where the editing button is tapped, the display target shifts to an editing screen on which a printed material (print result) to be obtained by printing the content corresponding to the content details screen is displayed and the content can be edited. FIG. 8 illustrates an example of the editing screen. The editing screen includes a back button 800, a print preview 801, a preview display reduction/enlargement control 802, a save button 803, and a print button 804. In a case where the back button 800 is tapped, the display target of the touch panel display 204 shifts to the screen (screen illustrated in FIG. 6) displayed before shifting to the currently displayed screen. The print preview 801 indicates a printed material (print result) to be obtained by printing the content selected by the user. In a case where the preview display reduction/enlargement control 802 is operated, the display area of the print preview 801 is enlarged or reduced. In a case where a text button 805 is tapped, a text input screen (not illustrated) is displayed. Text input on the text input screen is set on the content corresponding to the editing screen. A position where text is set can be freely set by the user, or may be predetermined for each content. In a case where an image button 806 is tapped, an image selection screen (not illustrated) is displayed. On the image selection screen, for example, an image held in the information processing apparatus 200 or an image held in the image data management server 102 can be selected. In a case where an image held in the image data management server 102 is selected, the printing application acquires the selected image from the image data management server 102. The image selected on the image selection screen is set on the content corresponding to the editing screen. A position where the screen is set can be freely set by the user, or may be predetermined for each content. In this manner, the contents of each content (contents of an image or text set on the content) can be edited, as needed, depending on the type of each content. The editing contents are reflected in the print preview 801, as needed. In a case where the save button 803 is tapped, the content corresponding to the print preview 801 currently displayed is saved. In a case where the print button 804 is tapped, the display target shifts to the print settings check screen.

Figure 9:
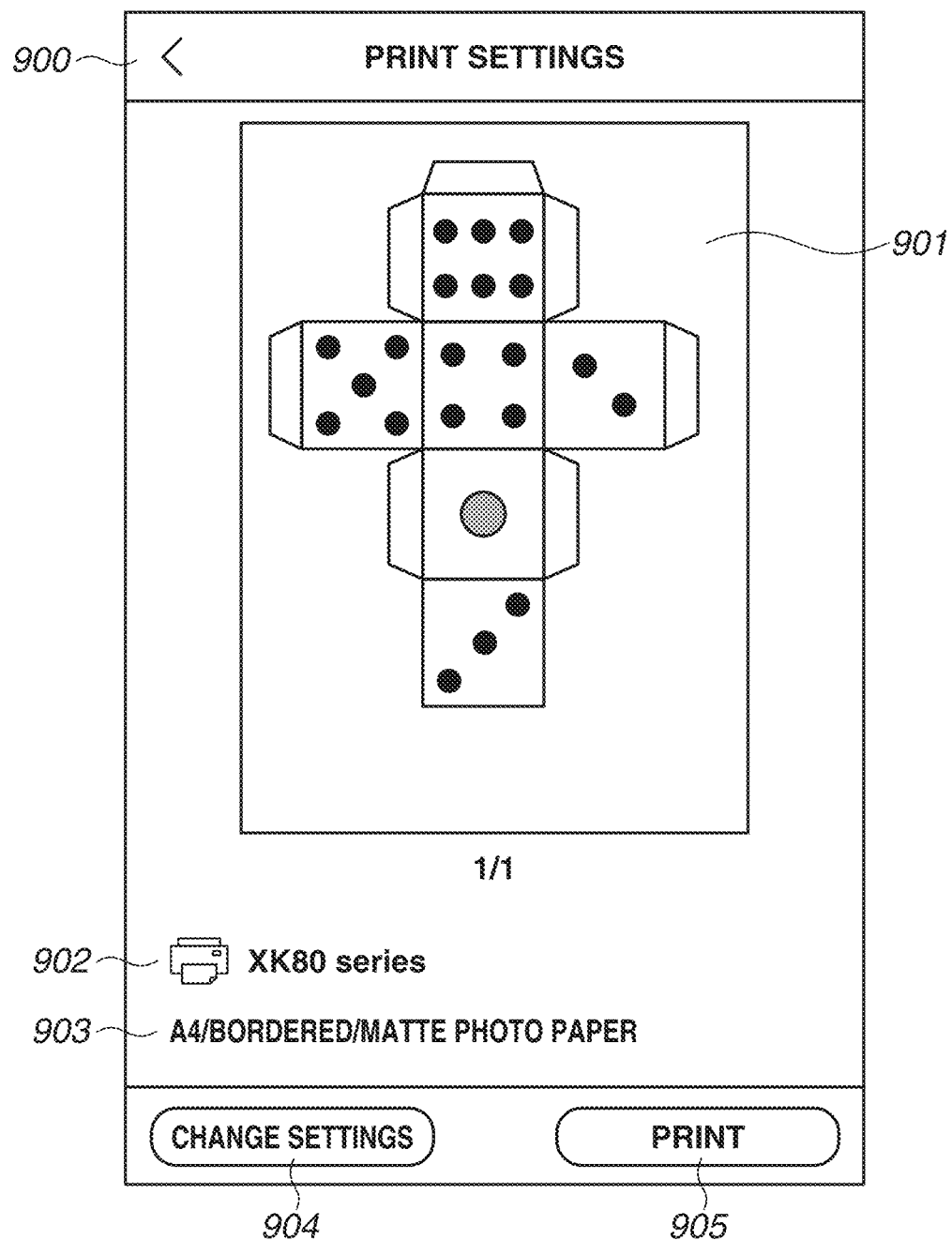
FIG. 9 is a diagram illustrating a print settings check screen according to one embodiment.

FIG. 9 illustrates an example of the print settings check screen. The print settings check screen illustrated in FIG. 9 is a print settings screen that is displayed in response to the print button 704 being tapped on the screen illustrated in FIG. 7. The print settings screen includes a back button 900, a preview display area 901, a registered printer information area 902, a print settings display area 903, a print setting button 904, and a print button 905. In a case where the back button 900 is tapped, the display target of the touch panel display 204 shifts to the screen (the screen illustrated in FIG. 7 or the screen illustrated in FIG. 8) displayed before shifting to the currently displayed screen. The preview display area 901 displays a print preview that includes display contents similar to those of the print preview 701 and the print preview 801 and is based on the content selected by the user and the result of editing the content.

In a case where the print setting button 904 is tapped, a print settings screen (not illustrated) for changing the printer to which a print job is transmitted and print settings is displayed. On the print settings screen, for example, the printer to which a print job is transmitted, the number of prints, a sheet type to be used for printing, a sheet size to be used for printing, and the like can be set or changed. The registered printer information area 902 displays information about the printer currently set as the printer to which a print job is transmitted. The print settings display area 903 displays print settings currently set. When the printer to which a print job is transmitted and print settings are changed on the print settings screen and the screen illustrated in FIG. 9 is displayed again, the changed contents are displayed in the registered printer information area 902 and the print settings display area 903. The contents displayed in the registered printer information area 902 and the print settings display area 903 are stored in the program memory 213 or the nonvolatile memory 221. Accordingly, in a case where the printing application is finished and is then re-started, the same contents are displayed again in the registered printer information area 902 and the print settings display area 903. When the printing application is first installed in the information processing apparatus 200 and the print settings check screen is displayed, default settings specified in the printing application are displayed in the registered printer information area 902 and the print settings display area 903.

In a case where the print button 905 is tapped, a print job for printing the content selected and edited by the user on the screens illustrated in FIGS. 5 to 9 is transmitted to the printing apparatus 300 based on the print settings. Specifically, the CPU 211 first executes rendering processing on the content selected and edited by the user, and converts the content into JPEG data. Further, the CPU 211 generates a print job by adding a print control command including print settings information or the like to the generated JPEG data. The print job generated as described above is transmitted to the printing apparatus 300. During a period in which the print job is transmitted and the printing apparatus 300 executes printing based on the print job, the display target of the touch panel display 204 shifts to a printing execution screen. On the printing execution screen, the rate of progress of printing based on the print job, contents of print settings for the transmitted print job, an area for cancelling printing based on the print job, and the like are displayed.

In a case where printing based on the print job is completed, the CPU 211 transmits information about the print job transmitted to the printing apparatus 300 (in other words, information about a printed material printed by the printing apparatus 300) to the notification management server 103. Specifically, the information about the print job is, for example, information about a content to be printed based on the print job. More specifically, the information about the print job is content ID information (identification information) indicating a content to be printed based on the print job. Alternatively, for example, the information about the print job is apparatus ID information indicating the information processing apparatus 200 that has transmitted the print job. In the present exemplary embodiment, a notification to be transmitted by the notification management server 103 is controlled based on these pieces of information. It may also be possible to transmit the information about the print job to the notification management server 103, for example, at a timing of when the print job is transmitted from the information processing apparatus 200, instead of a timing of when printing based on the print job is completed.

In the present exemplary embodiment, after the print job is transmitted by the printing application, notification processing for a printed material that is printed based on the print job or a piece of work that is obtained by assembling the printed material is executed. Specifically, for example, notification processing for prompting the user to capture an image of a printed material printed based on the print job, or an image of a piece of work obtained by assembling the printed material is executed. Further, notification processing for prompting the user to, for example, upload (or post) image data obtained by image capturing as described above to a social network service (SNS) to introduce the printed material or the assembled work is executed. In the present exemplary embodiment, the notification processing is executed by a push notification function included in the OS of the information processing apparatus 200. In other words, push notification processing to be described below is executed by the OS, but instead may be executed via an application program, such as the printing application, as needed.

Figure 11:
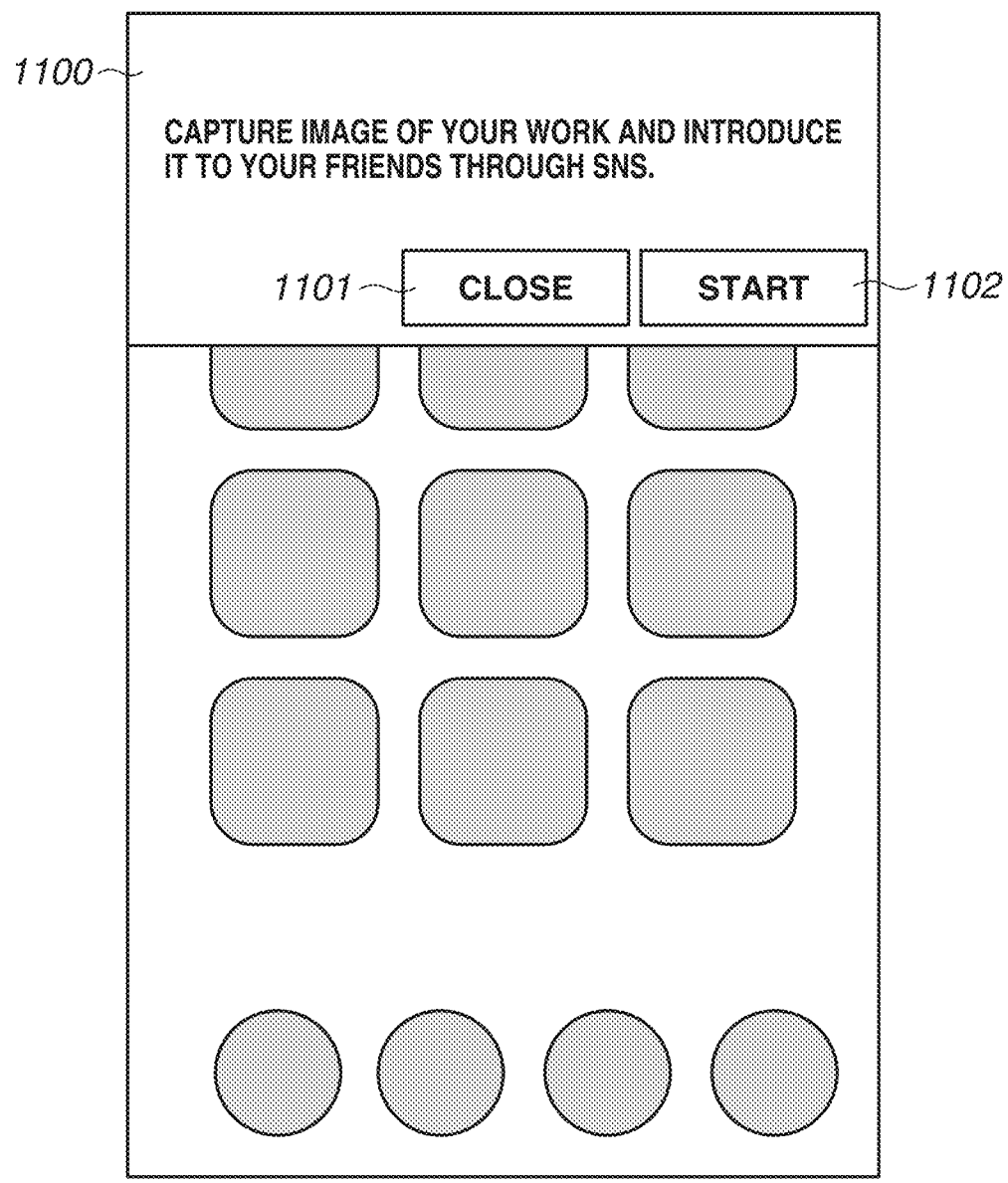
FIG. 11 is a diagram illustrating a screen in a state where a push notification is executed according to one embodiment.

FIG. 11 illustrates an example of a screen in a state where a notification is made by push notification. In a case where the information processing apparatus 200 receives push notification information, the OS displays a push notification area on the screen displayed by the information processing apparatus 200. FIG. 11 illustrates a state where a push notification area 1100 is displayed on a home screen of the information processing apparatus 200. The home screen is a screen on which icons respectively corresponding to application programs installed in the information processing apparatus 200 are displayed by the OS or the like. The application program corresponding to the selected icon is started in response to selection of each icon. The push notification area 1100 can also be displayed on a screen other than the home screen. For example, in a case where the screen corresponding to any one of the application programs is displayed, the push notification area 1100 can be displayed on the screen. The push notification area 1100 includes a notification message, a close button 1101, and a start button 1102. In the present exemplary embodiment, the notification message is a message for prompting the user to capture an image of a printed material printed based on a print job, or an image of a piece of work obtained by assembling the printed material. Alternatively, the notification message is a message for prompting the user to upload image data obtained by image capturing as described above to the SNS to introduce the printed material or work to his/her friends. In a case where the close button 1101 is tapped, the push notification area 1100 is closed and only the screen below the push notification area 1100 is displayed. In a case where the start button 1102 is tapped, an application program (camera application) for capturing an image with the camera unit 219 is started. In a case where a plurality of camera applications is installed in the information processing apparatus 200, the information processing apparatus 200 may ask the user to select any one of the plurality of camera applications and start the selected camera application. The push notification area 1100 illustrated in FIG. 11 includes a button for starting the selected camera application, but instead may include a button for starting another application. Specifically, for example, the push notification area 1100 may include a button for starting an application for posting captured image data to the SNS. Information (e.g., the name of the printing application, or the icon corresponding to the printing application) indicating the application program (printing application in this case) corresponding to the push notification area 1100 may be also displayed on the push notification area 1100.

As described above, in the present exemplary embodiment, the user executes notification processing as described above in a case where printing is executed. For a content that requires an assembly of a printed content, in general, it may be desirable that capturing an image of a piece of work and posting the captured image to the SNS is performed after the assembly of the content is completed and the piece of work is created. Specifically, for a content that requires an assembly of a printed content, it may be preferable to execute notification processing after the assembly of the content is completed and the piece of work is created, instead of executing the notification processing immediately after the content is printed. Accordingly, in the present exemplary embodiment, the notification processing is executed at an appropriate timing based on the printed content. FIG. 12 is a flowchart illustrating an example of processing for push notification executed by the notification management server 103. The flowchart illustrated in FIG. 12 is implemented by the CPU 1011 loading programs stored in the program memory 1012, the nonvolatile memory 1014, or the like into the data memory 1013 and executing the loaded programs.

In step S1201, the CPU 1011 determines whether information about a print job that is transmitted from the information processing apparatus 200 via the network is received. In a case where the CPU 1011 determines that information processing apparatus ID information and content ID information are not received (NO in step S1201), the determination processing of step S1201 is repeated until the information processing apparatus ID information and the content ID information are received. On the other hand, in a case where the CPU 1011 determines that the information processing apparatus ID information and the content ID information are received (YES in step S1201), the processing proceeds to step S1202. In step S1202, information (production period information) indicating a work production period to be taken for producing a piece of work that is produced by assembling the content corresponding to the received content ID information is acquired from the content management server 101. The term "work production period" used herein refers to a period that is generally required for producing a piece of work by assembling a content and varies based on the level of difficulty in assembling each piece of work. The period is preliminarily set by a vendor that provides each content. In the present exemplary embodiment, the production period information is set to be varied for each content. Specifically, for example, the production period set for the content, such as "dice", which requires simple assembly processing, is set to be shorter than the production period set for the content, such as "castle", which requires complicated assembly processing. The production period information may be set to be varied for each category, instead of being varied for each content. In the present exemplary embodiment, the production period is set in units of days, but instead may be set in units of minutes, in units of hours, or in units of seconds.

As described below, in the present exemplary embodiment, a push notification is executed based on identified production period information. Specifically, in the present exemplary embodiment, notification processing is executed at a timing of when a short period has passed since printing is executed for a content that does not require a long period for producing a piece of work, or for a content that does not require an assembly and is printed as a finished product. On the other hand, notification processing is executed at a timing of when a long period has passed since printing is executed and when it is highly likely that the production of work is completed for a content that requires a long period for producing a piece of work. Examples of a content that requires a long period for producing a piece of work include a content including a larger assisting image area described above. Examples of a content that does not require a long period for producing a piece of work and a content that does not require an assembly and is printed as a finished product include a content that includes a less assisting image area, or does not include the assisting image area. Examples of a content that requires a long period for producing a piece of work include a content based on which a larger number of printed materials can be obtained by printing the content. Examples of a content that does not require a long period for producing a piece of work and a content that does not require an assembly and is printed as a finished product include a content based on which only a small number of printed materials or one printed material is obtained by printing the content.

In step S1203, the CPU 1011 identifies a production completion time for the work that is produced by assembling the content corresponding to the received content ID information, based on the acquired production period information and current time information. After that, in step S1204, the CPU 1011 determines whether the current time is a time that production completion time has passed (or whether the current time matches the production completion time). This determination corresponds to a determination of whether the period corresponding to the production period information has passed since the content corresponding to the received content ID information is printed. In a case where the CPU 1011 determines that the current time is a time that the production completion time has not passed (NO in step S1204), the processing of step S1204 is repeated until the production completion time has passed. On the other hand, in a case where the CPU 1011 determines that the current time is the time that the production completion time has passed (YES in step S1204), the processing proceeds to step S1205. In step S1205, the CPU 1011 identifies the information processing apparatus 200 corresponding to the received information processing apparatus ID information and the information processing apparatus 200 executes processing for executing push notification. Specifically, the processing for executing push notification is processing for transmitting push notification information on the push notification area 1100 illustrated in FIG. 11 by push notification to the information processing apparatus 200. Thus, in the information processing apparatus 200, the push notification area 1100 illustrated in FIG. 11 is displayed. The push notification information may be transmitted to the information processing apparatus 200 via another server or the like. After that, the CPU 1011 terminates the processing.

As described above, in the present exemplary embodiment, notification processing for the content that is selected by the user and is printed can be appropriately executed based on the production period for work that is produced by assembling the content. Furthermore, the notification processing can be executed at an appropriate timing in accordance with the type of each printed content.

In a case where a print job for printing a content that does not require a long period for producing a piece of work or a content that does not require an assembly and is printed as a finished product is transmitted, a configuration in which push notification is not executed may be employed. Specifically, for example, when a print job for printing a content in a category other than "paper craft" is transmitted, a configuration in which push notification is not executed may be employed. In other words, whether to execute push notification may be controlled in accordance with the type or contents of each content, or in accordance with the type or contents of each category. In the configuration in which push notification is not executed, information about the print job after the print job is transmitted or after printing based on the print job is completed is not transmitted to the notification management server 103.

In a case where a print job for printing a content that does not require a long period for producing a piece of work or a content that does not require an assembly and is printed as a finished product is transmitted, a configuration in which notification processing different from push notification is executed may be employed. Examples of notification processing different from push notification include notification processing for notification on a screen displayed in the foreground by the printing application. Specifically, whether to execute notification processing for a printed material (capturing of an image of a piece of work and posting of captured image data to the SNS) by push notification or by notification on a screen displayed in the foreground by the printing application may be controlled in accordance with the type or contents of each content, or in accordance with the type or contents of each category. Processing to be executed by the information processing apparatus 200 in this configuration will be described below.

FIG. 13 is a flowchart illustrating an example of processing for controlling whether to execute notification processing for a printed material by push notification or by notification on the screen displayed in the foreground by the printing application. The flowchart illustrated in FIG. 13 is implemented by the CPU 211 loading printing application programs stored in the program memory 213, the nonvolatile memory 221, or the like into the data memory 214 in the form of a RAM and executing the loaded programs. All the processing illustrated in FIG. 13 is not necessarily executed sequentially in a single process. For example, the OS may execute processing once and the printing application may be invoked from the OS again, and then the subsequent processing may be executed by the printing application. This processing is started after the screen is shifted as described above and the content is selected and edited.

In step S1301, the CPU 211 determines whether printing based on a print job transmitted to the printing apparatus 300 is completed. The CPU 211 acquires, as needed, information about the progress of printing from the printing apparatus 300, and executes the determination processing based on the information. In a case where the CPU 211 determines that printing is not completed (NO in step S1301), the processing of step S1301 is repeated until printing is completed. In a case where the CPU 211 determines that printing is completed (YES in step S1301), the processing proceeds to step S1302.

In step S1302, the CPU 211 determines whether to execute notification processing for prompting the user to capture an image of a piece of work and post captured image data to the SNS by push notification or by notification on the screen displayed in the foreground by the printing application. As described above, in the present exemplary embodiment, in a case where a content that requires a long period for producing a piece of work is printed, the notification processing is executed by push notification, and in a case where a content that does not require a long period for producing a piece of work or a content that does not require an assembly and is printed as a finished product is printed, the notification processing is executed by notification on a screen displayed by the printing application. Accordingly, in this determination processing, the CPU 211 determines whether the printing completed by the printing apparatus 300 corresponds to printing of a content that requires a long period for producing a piece of work. In this process, the printing application may manage information about a production period for each content and to execute the determination based on the information. In a configuration in which the notification method is controlled based on each category, the CPU 211 performs determination for printing completed by the printing apparatus 300 to determine which of the categories' content has been printed. In this case, for example, in a case where the printing completed by the printing apparatus 300 corresponds to printing of the content in the category of "paper craft", the CPU 211 determines that the notification processing is executed by push notification. In a case where the printing completed by the printing apparatus 300 corresponds to printing of a content in a category other than "paper craft", the CPU 211 determines that the notification processing is executed by notification on the screen displayed in the foreground by the printing application. In a case where the CPU 211 determines that the notification processing is executed by push notification (YES in step S1302), the processing proceeds to step S1303. In a case where the CPU 211 determines that the notification processing is executed by notification on a screen displayed in the foreground by the printing application (NO in step S1303), the processing proceeds to step S1304.

In step S1303, the CPU 211 transmits information about the print job to the notification management server 103. Accordingly, the notification management server 103 executes notification control processing as illustrated in FIG. 12. After a lapse of the work production period, push notification is executed.

On the other hand, in step S1304, the CPU 211 executes notification processing for a printed material printed based on the print job or a piece of work obtained by assembling the printed material by notification on the screen displayed in the foreground by the printing application. Specifically, the CPU 211 does not execute notification processing for a notification area similar to the push notification area 1100 by push notification, but instead executes the notification processing for the screen displayed in the foreground by the printing application. More specifically, in this configuration, a notification about a content that does not require a long period for producing a piece of work or a content that does not require an assembly and is printed as a finished product is made on the printing application immediately after completion of printing. In step S1304, control processing for executing push notification may be further executed. In other words, a configuration in which both the notification processing by push notification at a timing based on the work production period and the notification processing by notification on the screen displayed in the foreground by the printing application immediately after completion of printing are executed may be employed.

With this configuration, the notification processing can be appropriately executed in accordance with the type or contents of each content, or in accordance with the type or contents of each category.

While the above-described exemplary embodiment illustrates a configuration in which notification corresponding to the content production period is executed by push notification, the present exemplary embodiment is not limited to this configuration. Notification based on the content production period may be executed on the screen displayed by the printing application. In this case, processing for managing the notification as illustrated in FIG. 12 may be executed by the information processing apparatus 200 using the printing application. In a case where the processing for managing the notification can be executed only when the printing application is running in the foreground, the notification processing is executed at a timing of when the current time is a time that the production completion time has passed and the printing application is running in the foreground.

Various embodiments of the present disclosure can also be attained by processing in which a recording medium storing a software program code for implementing functions according to the above-described exemplary embodiments is supplied to a system or an apparatus, and the program code stored in the recording medium is executed by a computer of the system or the apparatus. In this case, the functions according to the exemplary embodiments described above are implemented by the program code read out from the storage medium, and the respective storage medium storing the program code constitutes embodiments of the present disclosure.

As the storage medium for supplying the program code, for example, a flexible disk, a hard disk, an optical disk, a magneto-optical disk, a compact disc (CD)-ROM, a CD-recordable (R), a magnetic tape, a nonvolatile memory card, a ROM, and a digital versatile disc (DVD) can be used.

According to an exemplary embodiment of the present disclosure, an information processing apparatus can be controlled to appropriately execute notification processing.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While various embodiments the present disclosure have been described with reference to exemplary embodiments, it is to be understood that embodiments of the disclosure are not limited to the disclosed exemplary embodiments. The scope of the following claims is to be accorded the broadest interpretation so as to encompass all such modifications and equivalent structures and functions.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-127363, filed Jul. 28, 2020, which is hereby incorporated by reference herein in its entirety.

What is claimed is:

1. A notification system comprising:
a printing apparatus; and
a server system, the server system being provided outside the printing apparatus and being provided outside an information processing apparatus,
wherein the printing apparatus includes a printing unit configured to print a content,
wherein the server system includes a control unit configured to control the information processing apparatus to execute, at a first timing, notification processing for a first printed material obtained by printing a first content, based on information indicating that the content printed by the printing apparatus corresponds to the first content, and to control the information processing apparatus to execute, at a second timing earlier than the first timing, notification processing for a second printed material obtained by printing a second content, based on information indicating that the content printed by the printing apparatus corresponds to the second content, the second content being different from the first content,
wherein in a case where the content printed by the printing apparatus corresponds to the first content, the information processing apparatus is controlled to execute the notification processing based on information indicating that a first period corresponding to the first content has passed since the first content was printed, and
wherein in a case where the content printed by the printing apparatus corresponds to the second content, the information processing apparatus is controlled to execute the notification processing based on information indicating that a second period corresponding to the second content has passed since the second content was printed, the second period being shorter than the first period.

2. The notification system according to claim 1, wherein the first content includes an assisting image area for assisting processing of a printed material.

3. The notification system according to claim 2, wherein the second content does not include the assisting image area.

4. The notification system according to claim 2, wherein the second content includes an assisting image area smaller than the assisting image area in the first content.

5. The notification system according to claim 2, wherein the assisting image area in the first content includes at least one of a line indicating a cutting position, a line indicating a folding position, or an overlap width.

6. The notification system according to claim 1, wherein in a case where the content printed by the printing apparatus corresponds to a third content that is different from the first content and the second content, notification processing for a third printed material obtained by printing the third content is not executed.

7. The notification system according to claim 1,
wherein the first content includes an assisting image area for assisting processing of a printed material,
wherein in a case where the content printed by the printing apparatus corresponds to a third content that is different from the first content and the second content, notification processing for a third printed material obtained by printing the third content is not executed, and
wherein the third content includes an assisting image area smaller than the assisting image area in the first content, or does not include an assisting image area.

8. The notification system according to claim 1, wherein control for causing the information processing apparatus to execute the notification processing for the first printed material is control for transmitting, to the information processing system, notification information for causing the server system to execute the notification processing for the first printed material.

9. The notification system according to claim 8, wherein the notification processing for the first printed material is controlled to be executed based on notification information received from the server system, and the notification processing for the second printed material is controlled to be executed without receiving notification information from the server system provided outside the printing apparatus and outside the information processing apparatus.

10. The notification system according to claim 8, wherein the notification processing for the first printed material is controlled to be executed by a push notification function of the information processing apparatus, and the notification processing for the second printed material is controlled to be executed on a screen displayed in a foreground by a predetermined application program for causing the printing apparatus to execute printing.

11. The notification system according to claim 1, wherein control for causing the information processing apparatus to execute the notification processing for the first printed material is control for causing a predetermined application program in the information processing apparatus to execute the notification processing for the first printed material.

12. The notification system according to claim 1, further comprising:
an acquisition unit configured to acquire content information about the content printed by the printing apparatus,
wherein a timing of when the notification processing is executed by the information processing apparatus is controlled based on the content information.

13. The notification system according to claim 1, wherein the information processing apparatus configured to execute the notification processing for the first printed material is an apparatus configured to transmit a print job for printing the first content to the printing apparatus.

14. The notification system according to claim 1, wherein the notification processing for the first printed material is notification processing for prompting a user to perform at least one of image capturing of the first printed material or uploading of image data obtained by capturing an image of the first printed material to a social network service.

15. The notification system according to claim 1, wherein the notification processing for the first printed material is processing for displaying a notification area for the first printed material.

16. The notification system according to claim 1,
wherein the notification processing for the first printed material is notification processing for prompting a user to perform at least one of image capturing of the first printed material and uploading of image data obtained by capturing an image of the first printed material to a social network service, and for displaying a notification area for the first printed material, and
wherein the notification area for the first printed material includes an area for starting at least one of an application program for capturing an image of the first printed material and an application program for uploading image data obtained by capturing an image of the first printed material to the social network service.

17. A notification system comprising:
a printing apparatus; and
a server system, the server system being provided outside the printing apparatus and being provided outside an information processing apparatus,
wherein the printing apparatus includes a printing unit configured to print a content,
wherein the server system includes a control unit configured to control the information processing apparatus to execute, at a first timing, notification processing for a first printed material obtained by printing a first content, based on information indicating that the content printed by the printing apparatus corresponds to the first content, and to control the information processing apparatus to execute, at a second timing earlier than the first timing, notification processing for a second printed material obtained by printing a second content, based on information indicating that the content printed by the printing apparatus corresponds to the second content, the second content being different from the first content, and
wherein in a case where the content printed by the printing apparatus corresponds to a third content that is different from the first content and the second content, notification processing for a third printed material obtained by printing the third content is not executed.

18. A notification system comprising:
a printing apparatus; and
a server system, the server system being provided outside the printing apparatus and being provided outside an information processing apparatus,
wherein the printing apparatus includes a printing unit configured to print a content,
wherein the server system includes a control unit configured to control the information processing apparatus to execute, at a first timing, notification processing for a first printed material obtained by printing a first content, based on information indicating that the content printed by the printing apparatus corresponds to the first content, and to control the information processing apparatus to execute, at a second timing earlier than the first timing, notification processing for a second printed material obtained by printing a second content, based on information indicating that the content printed by the printing apparatus corresponds to the second content, the second content being different from the first content, and
wherein control for causing the information processing apparatus to execute the notification processing for the first printed material is control for transmitting, to the information processing system, notification information for causing the server system to execute the notification processing for the first printed material.

* * * * *